(12) United States Patent
Matznick et al.

(10) Patent No.: US 11,075,569 B2
(45) Date of Patent: Jul. 27, 2021

(54) TOOLING ASSEMBLY FOR ENGAGING WIRE ENDS OF STATOR ASSEMBLY

(71) Applicant: GM Global Technology Operations LLC, Detroit, MI (US)

(72) Inventors: Dalton D. Matznick, Madison Heights, MI (US); Mithun Sunny, Farmington Hills, MI (US); Timothy M. Wilson, Howell, MI (US); Frederick W. Rhoads, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 16/229,135

(22) Filed: Dec. 21, 2018

(65) Prior Publication Data

US 2020/0204048 A1 Jun. 25, 2020

(51) Int. Cl.
*B23P 19/00* (2006.01)
*H02K 15/02* (2006.01)
*H02K 15/085* (2006.01)
*H02K 15/00* (2006.01)

(52) U.S. Cl.
CPC ....... *H02K 15/024* (2013.01); *H02K 15/0068* (2013.01); *H02K 15/085* (2013.01); *Y10T 29/53143* (2015.01)

(58) Field of Classification Search
CPC .. H02K 15/085; H02K 15/09; H02K 15/0068; H02K 15/0087; H01R 43/048; Y10T 29/49009; Y10T 29/49012; Y10T 29/53065; Y10T 29/53143; Y10T 29/53235
USPC ....... 29/732, 34 R, 596, 598, 729, 735, 736, 29/738, 753
See application file for complete search history.

(56) References Cited

U.S. PATENT DOCUMENTS

| | | | |
|---|---|---|---|
| 6,990,724 B2 * | 1/2006 | Tamura | H02K 15/0056 29/596 |
| 8,671,559 B2 * | 3/2014 | Kleber | H01R 43/04 29/753 |
| 9,525,316 B2 | 12/2016 | Kleber | |
| 2013/0313239 A1 | 11/2013 | De Souza et al. | |

* cited by examiner

*Primary Examiner* — Thiem D Phan (57) ABSTRACT

A method of engaging wire ends of a stator assembly. The method involves advancing multiple fingers radially inwardly toward the wire ends, and rotating the fingers. The fingers have protrusions that engage the wire ends. A tooling assembly for engaging the wire ends has a first plate, a second plate, and has the fingers. The first plate has slots, and the second plate has teeth. The fingers have pins that ride in the slots of the first plate, and the fingers have teeth that mesh with the teeth of the second plate.

9 Claims, 6 Drawing Sheets

TOOLING ASSEMBLY FOR ENGAGING WIRE ENDS OF STATOR ASSEMBLY

INTRODUCTION

The present disclosure relates to the manufacture of stator assemblies of electric devices such as motors and generators, and more particularly relates to tooling for engaging wire ends of stator assemblies.

Stator assemblies are components of larger electric devices such as motors and generators. Motors and generators are increasingly being equipped in advanced and more electrified propulsion systems of automobiles. A stator assembly can include a stack of steel laminations and a copper winding situated at the laminations. Bar pin stator assemblies are a type of stator assembly that can have a heavy gauge copper winding of rectangular cross-section. Wire ends of the copper windings in bar pin stator assemblies typically jut out from an end of the laminations. Pairs of neighboring wire ends are conventionally joined together in order to establish an electrical connection therebetween. The joining can involve welding.

SUMMARY

In an embodiment, a method of engaging wire ends of a stator assembly may include an advancing step and a rotating step. The advancing step may involve advancing multiple fingers radially inwardly toward the wire ends of the stator assembly. The rotating step may involve rotating the fingers. Protrusions of the fingers engage the wire ends of the stator assembly.

In an embodiment, advancing the fingers radially inwardly involves revolving a first plate.

In an embodiment, the first plate has slots residing therein. The fingers have pins. The pins ride in the slots when the first plate is revolved.

In an embodiment, advancing the fingers radially inwardly involves advancing all of the fingers simultaneously in order to effect engagement of all of the wire ends of the stator assembly at the same time.

In an embodiment, rotating the fingers involves revolving a second plate.

In an embodiment, the second plate has a set of first teeth. The fingers each have a set of second teeth. The set of first teeth mesh with the set of second teeth when the second plate is revolved.

In an embodiment, rotating the fingers involves rotating all of the fingers simultaneously in order to effect engagement of all of the wire ends of the stator assembly at the same time.

In an embodiment, the method further includes activating a first actuator in order to advance the fingers radially inwardly.

In an embodiment, the method further includes activating a second actuator in order to rotate the fingers.

In an embodiment, the method further includes retracting the fingers radially outwardly away from the wire ends of the stator assembly.

In an embodiment, the method further includes crowding pairs of wire ends of the stator assembly by way of the protrusions of the fingers upon rotation of the fingers.

In an embodiment, the method lacks movement of the fingers in a z-axis with respect to the stator assembly.

In an embodiment, a tooling assembly for engaging wire ends of a stator assembly may include a first plate, a second plate, and multiple fingers. The first plate has multiple slots residing therein. The second plate has a set of first teeth thereon. The fingers can engage with the wire ends of the stator assembly. The fingers have multiple pins that can ride in the slots of the first plate when the first plate is subjected to revolving movement. The fingers also have a set of second teeth that can mesh with the set of first teeth of the second plate when the second plate is subjected to revolving movement.

In an embodiment, the slots are arcuate in shape. When the first plate is revolved, the fingers advance in a radial direction toward the wire ends of the stator assembly.

In an embodiment, when the second plate is revolved, the fingers rotate about their axes for engaging the wire ends of the stator assembly.

In an embodiment, the fingers have protrusions. The protrusions are used to crowd pairs of wire ends of the stator assembly when the second plate is revolved.

In an embodiment, the tooling assembly may include a first actuator. The first actuator is interconnected with the first plate for revolving the first plate.

In an embodiment, the tooling assembly may include a second actuator. The second actuator is interconnected with the second plate for revolving the second plate.

In an embodiment, during use of the tooling assembly, the fingers engage all of the wire ends of the stator assembly at the same time.

In an embodiment, during use of the tooling assembly, the fingers engage the wire ends of the stator assembly without movement of the fingers in a z-axis with respect to the stator assembly.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

With reference to the figures, a tooling assembly 10 is employed in a method to engage wire ends 12 of a stator assembly 14. The wire ends 12 are engaged for joining purposes. The tooling assembly 10 is designed and constructed so that, in certain embodiments, it can engage all of the wire ends 12 of the stator assembly 14 simultaneously, while maintaining the true position of the wire ends 12 amid engagement. The tooling assembly 10 can further carry out engagement and disengagement of the wire ends 12 without z-axis movement. Compared to past procedures, the method and tooling assembly 10 described herein can furnish one or more of the following advancements, according to different embodiments: improvement in part-to-part cycle time, reduction in rework, reduction in position variation of the wire ends 12, minimized repetitive movement of the tooling assembly 10, and/or minimized or altogether eliminated part damage. The tooling assembly 10 and method facilitate high speed and high volume manufacture of the stator assembly 14 for increased stator-to-stator throughput and a faster joining process of the wire ends 12, resulting in a more efficient and more effective process than previously known.

Figure 2:
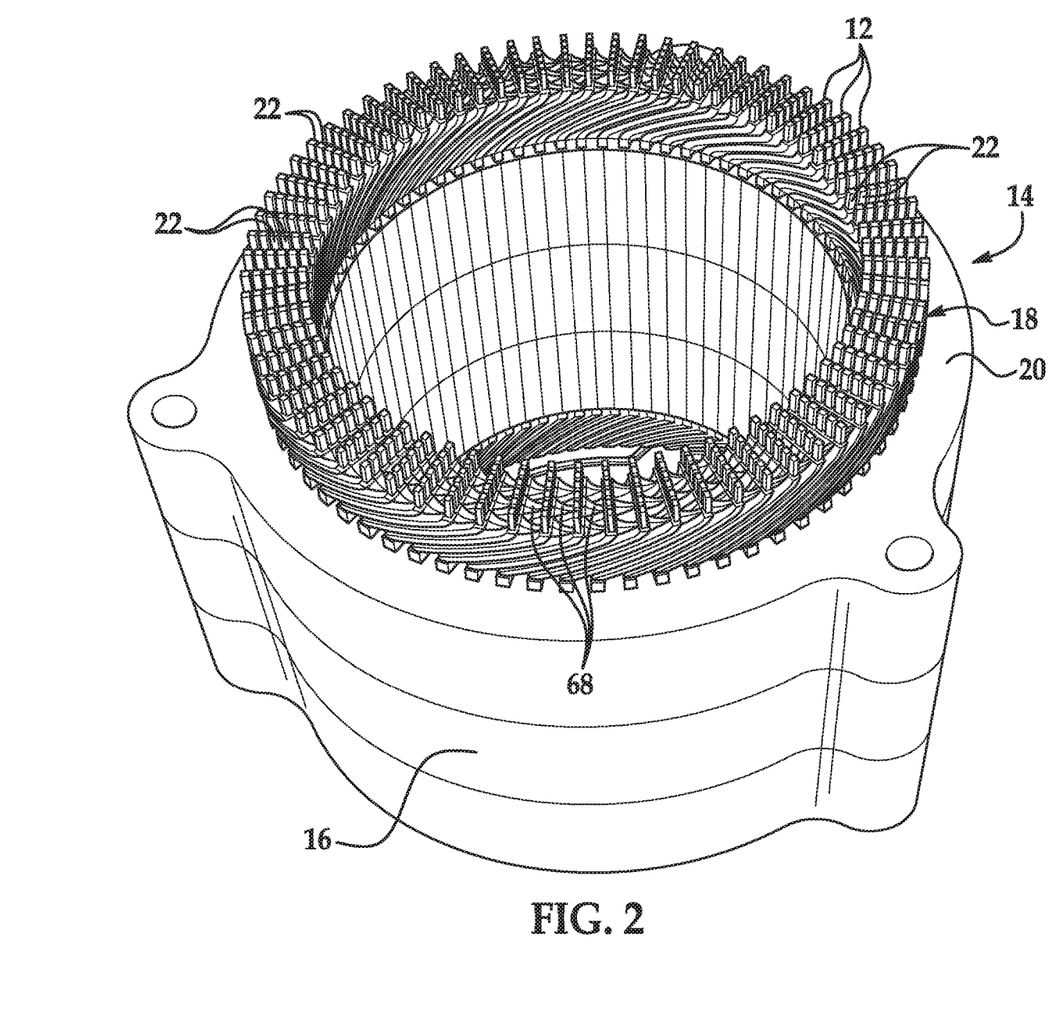
FIG. 2 is a perspective view of an example of a stator assembly.

The stator assembly 14 is but one component of a larger electric device such as a motor or generator equipped in an advanced and more electrified propulsion system of an automobile; still, the stator assembly 14 can be used in other applications that may include non-automotive implementations. In the example presented in FIG. 2, the stator assembly 14 has a stack of steel laminations 16 and a copper winding 18 carried by the laminations 16. The stator assembly 14 here is of the bar pin type, but could be of other types in other examples. The wire ends 12 of the copper winding 18 jut out from an end 20 of the laminations 16. Pairs 22 of the wire ends 12 are joined together as a process in the manufacture of the stator assembly 14 in order to establish an electrical connection therebetween. The joining process can involve welding and can occur after the wire ends 12 are engaged by the tooling assembly 10 and method described herein. Example welding techniques include gas tungsten arc welding (GTAW or TIG), plasma arc welding (PAW), laser welding, or electric resistance welding (ERW).

The tooling assembly 10 and method perform one process in the manufacture of the stator assembly 14 and can constitute one station of the overall and larger manufacturing footprint. The tooling assembly 10 can have various designs and constructions in different embodiments depending upon—among other potential factors—the design and construction of the stator assembly 14 and its wire ends 12 subject to engagement, as well as the subsequent joining process. In the embodiment of the figures, the tooling assembly 10 may include a first actuator 24, a second actuator 26, a first plate 28, a second plate 30, and multiple fingers 32; skilled artisans will appreciate that the tooling assembly 10 can include other components such as a stand, housings, covers, and/or guides, depending on the particular application.

Figure 1:
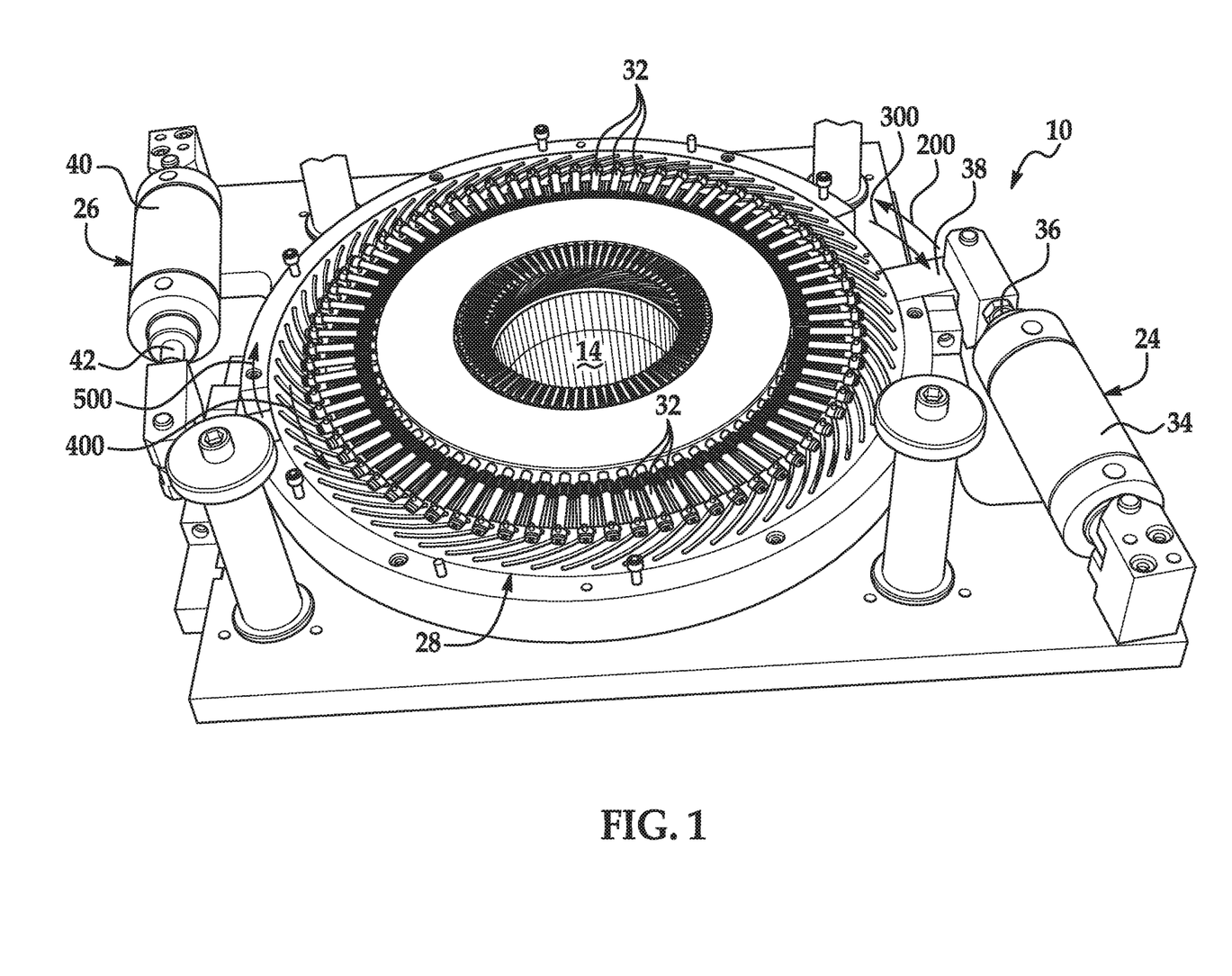
FIG. 1 is a perspective view of an embodiment of a tooling assembly employed to engage stator assembly wire ends.

The first actuator 24 imparts revolving movement to the first plate 28 when the first actuator 24 is prompted to activate. A controller of the tooling assembly 10 can manage activation and deactivation of the first actuator 24. With particular reference to FIG. 1, the first actuator 24 is interconnected with the first plate 28 for revolving the first plate 28. The first actuator 24 can be of various types in different embodiments including a pneumatic actuator, servo actuator, hydraulic actuator, or screw-drive actuator, as examples. In FIG. 1, the first actuator 24 has a cylinder 34, a shaft 36, and an extension 38. The shaft 36 translates back and forth when prompted. The interconnection between the first actuator 24 and first plate 28 can involve bolting or some other fastening technique. In an example, the extension 38 is coupled to the first plate 28 and forward movement of the shaft 36 causes the first plate 28 to revolve in a first rotational direction 200, and rearward movement of the shaft 36 causes the first plate 28 to revolve in an opposite second rotational direction 300. The revolutions in these rotational directions may only be over a circumferential extent necessary to advance and retract the fingers 32 for engagement and disengagement actions. Since the fingers 32 are depicted in an advanced state in FIG. 1, revolving the first plate 28 in the first rotational direction 200 would bring the fingers 32 to a retracted state.

The second actuator 26 imparts revolving movement to the second plate 30 when the second actuator 26 is prompted to activate. The controller of the tooling assembly 10 can manage activation and deactivation of the second actuator 26. With continued reference to FIG. 1, the second actuator 26 is interconnected with the second plate 30 for revolving the second plate 30. The second actuator 26 can be of various types in different embodiments including a pneumatic actuator, servo actuator, hydraulic actuator, or screw-drive actuator, as examples. In FIG. 1, and like the first actuator 24, the second actuator 26 has a cylinder 40, a shaft 42, and an extension (extension largely obscured from view in FIG. 1). The shaft 42 translates back and forth when prompted. The interconnection between the second actuator 26 and second plate 30 can involve bolting or some other fastening technique. In an example, the extension of the second actuator 26 is coupled to the second plate 30 and forward movement of the shaft 42 causes the second plate 30 to revolve in a first rotational direction 400 (same as first rotational direction 200), and rearward movement of the shaft 42 causes the second plate 30 to revolve in an opposite second rotational direction 500 (same as second rotational direction 300). The revolutions in these rotational directions may only be over a circumferential extent necessary to rotate the fingers 32 for engagement and disengagement actions.

Figure 3:
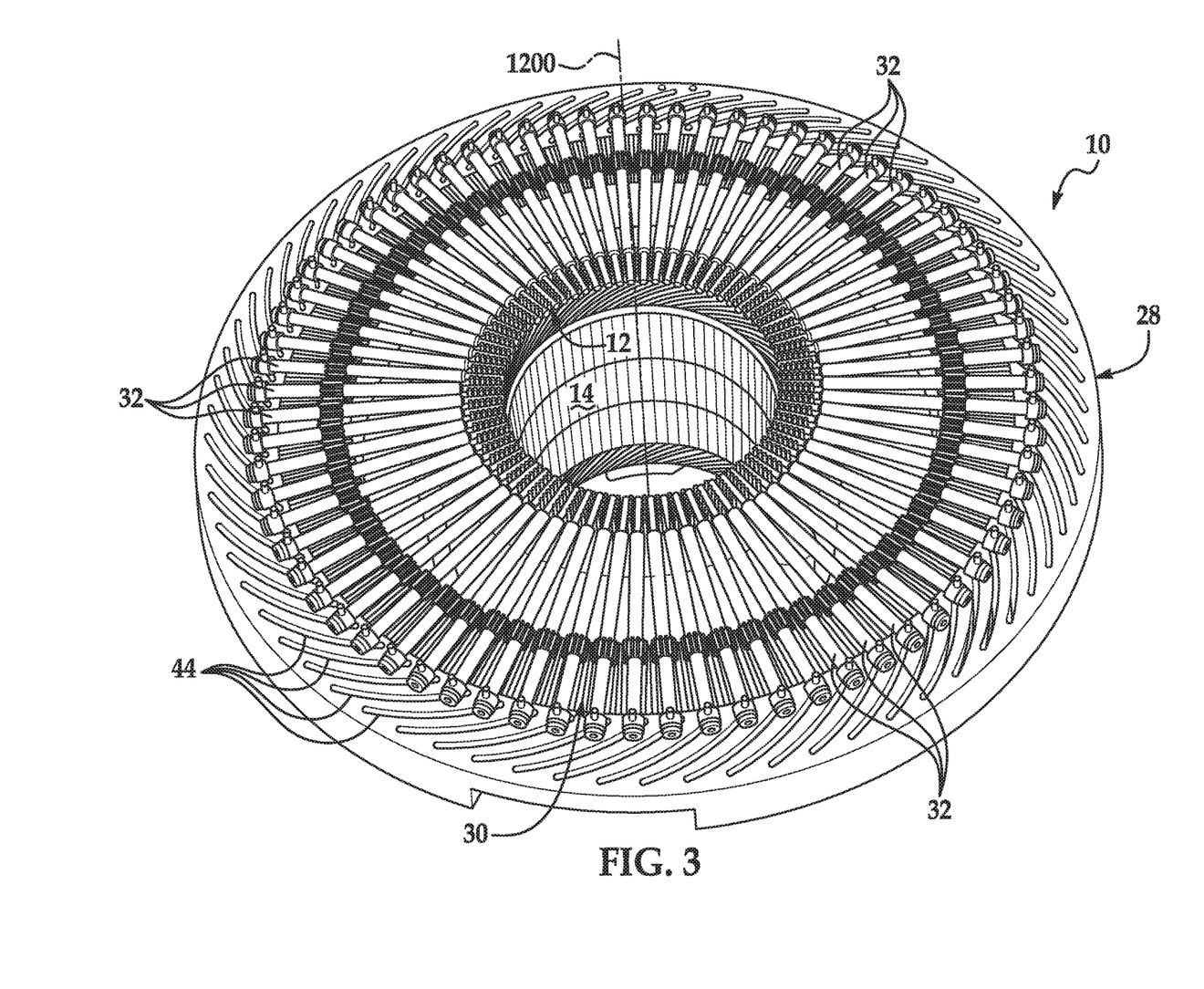
FIG. 3 depicts components of the tooling assembly of FIG. 1.
Figure 5:
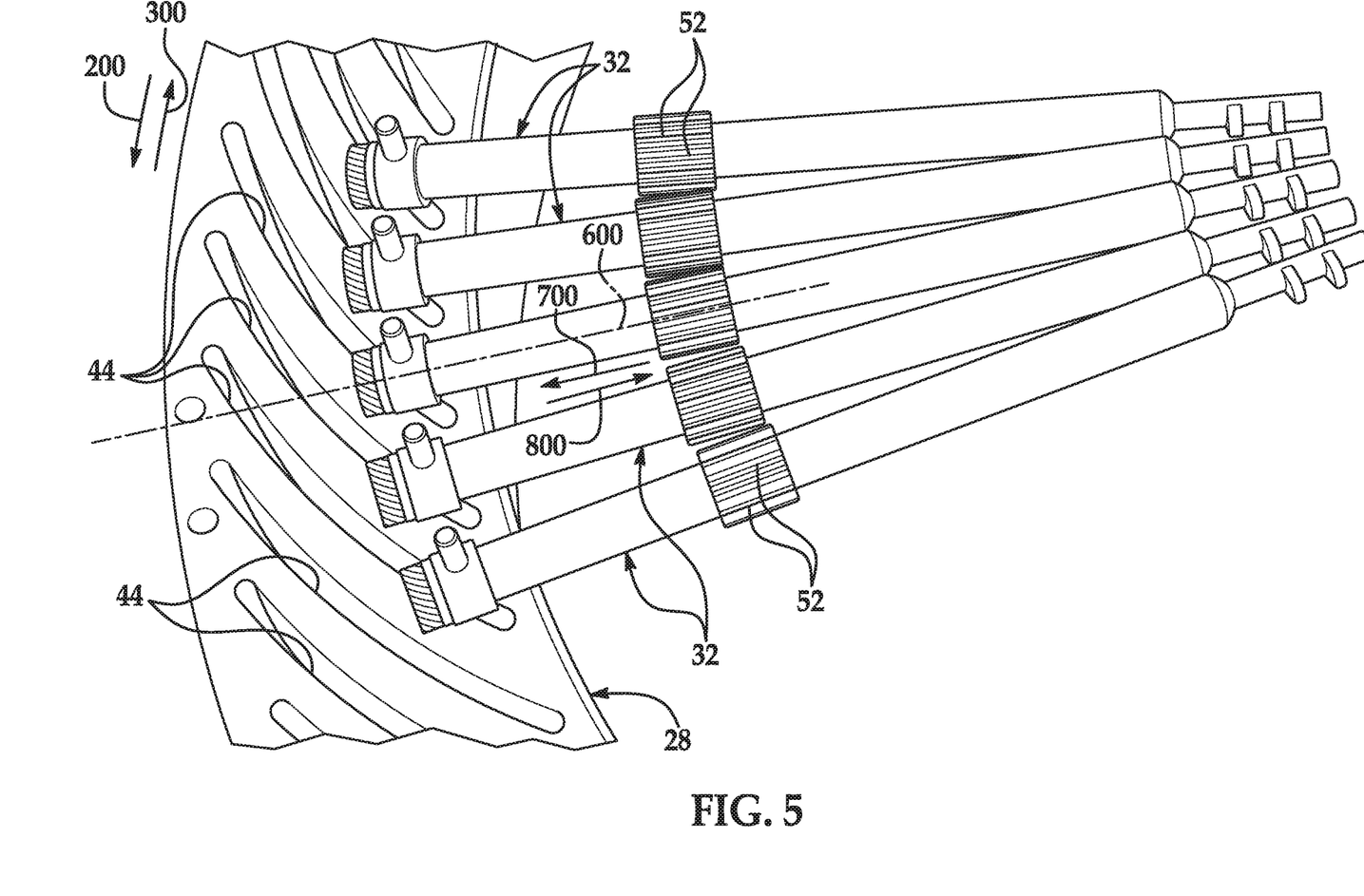
FIG. 5 is another enlarged view of the fingers of FIG. 4.

The first plate 28 is used in the tooling assembly 10 to provide the fingers 32 with advancing and retracting movements. With particular reference to FIGS. 3 and 5, in this embodiment the first plate 28 has an annular shape. Relative to the second plate 30, the first plate 28 is situated radially outboard of the second plate 30, and the two plates 28, 30 are concentric with each other and exhibit independent revolving movement. Multiple slots 44 are defined in and reside in the first plate 28. The slots 44 slidingly receive the fingers 32. The slots 44 are disposed around the entire circumference of the first plate 28, with respect to the annular shape of the first plate 28 and as perhaps demonstrated best by FIG. 3. Individual slots 44 are arcuate and curving in longitudinal profile. Each slot 44 is orientated at an angle relative to a radius 600 (FIG. 5) of the annular shape of the first plate 28. The arcuate and curving longitudinal profiles of the slots 44 propel and pilot advancing and retracting linear movements of the fingers 32 along the radius 600. In the segmented view of FIG. 5, for instance, revolving the first plate 28 in the first rotational direction 200 would move the fingers 32 radially-outwardly in a radial outward direction 700 for retraction. From the retracted state, revolving the first plate 28 in the second rotational direction 300 would move the fingers 32 radially-inwardly in a radial inward direction 800 for advancement. In FIG. 5 the fingers 32 are presented in the advanced state. These retraction and advancement movements are linear and along the respective radii of the first plate 28. With particular reference to FIG. 3, since all of the fingers 32 are slidingly received in an individual slot 44 of the first plate 28, all of the fingers 32 advance and retract together and concurrently with one another.

Figure 4:
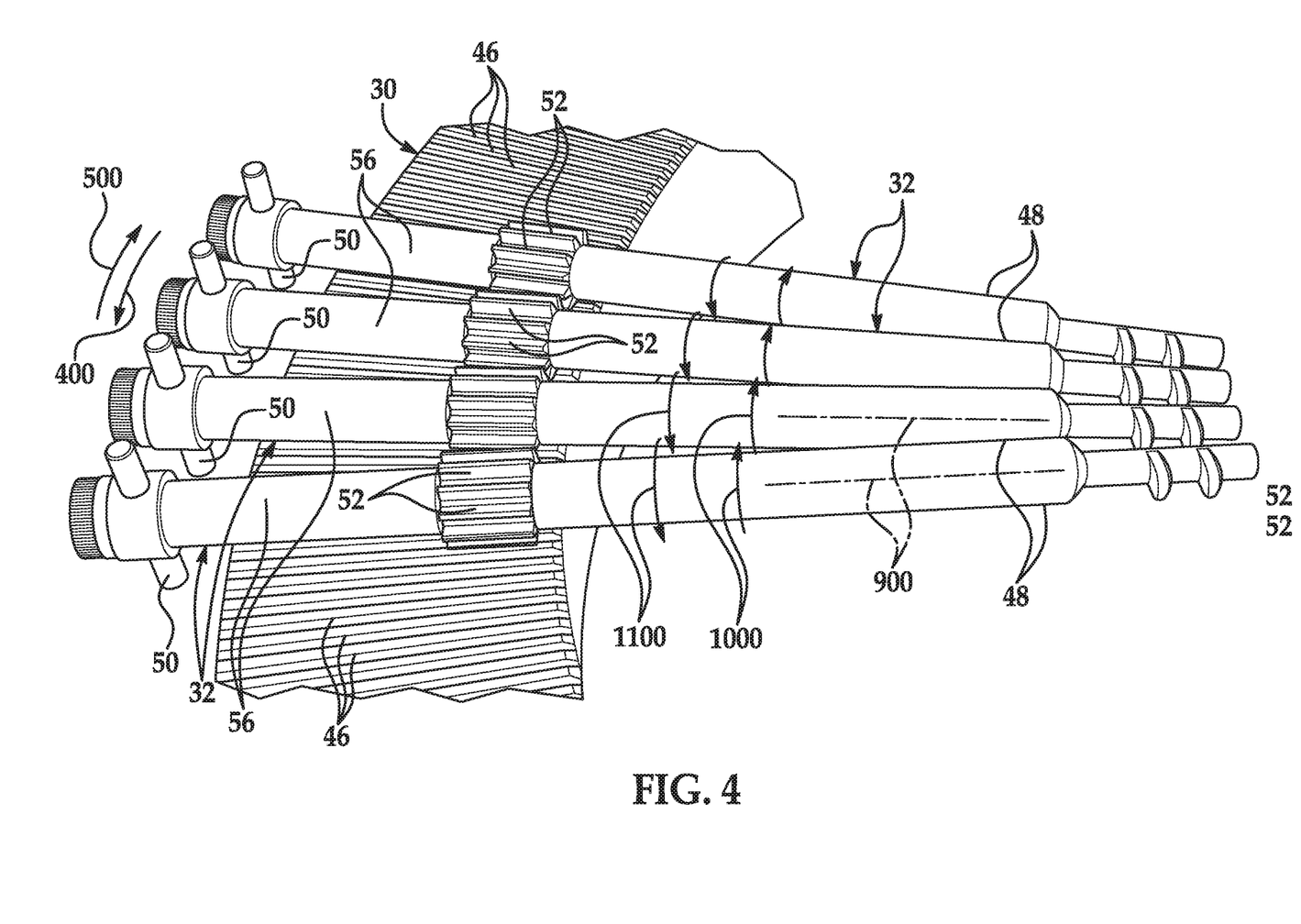
FIG. 4 is an enlarged view of an embodiment of fingers of the tooling assembly of FIG. 1.

The second plate 30 is used in the tooling assembly 10 to provide the fingers 32 with rotating movements. With particular reference to the segmented view of FIG. 4, in this embodiment the second plate 30 has an annular shape. The second plate 30 is situated radially inboard of the first plate 28. A first set of teeth 46 resides on the second plate 30 and is disposed around the entire circumference of the second plate 30 relative to the annular shape of the second plate 30 and as perhaps demonstrated best by FIG. 3. The first set of teeth 46 mesh with the fingers 32 and, upon revolution of the second plate 30, the meshing interaction causes a working portion 48 of the fingers 32 to rotate in place about axes 900 (FIG. 4) of the fingers 32. In an example, the fingers 32 can rotate back and forth about the axes 900 over approximately ninety degrees (90°). In FIG. 4, for instance, revolving the second plate 30 in the first rotational direction 400 would rotate the working portions 48 of the fingers 32 in a first rotational direction 1000 for disengagement of the wire ends 12. From the engaged state as presented in FIG. 4, revolving the second plate 30 in the second rotational direction 500 would rotate the working portions 48 in a second rotational direction 1100 for engagement of the wire ends 12. Since all of the fingers 32 mesh with the first set of teeth 46, all of the fingers 32 of the tooling assembly 10 are caused to rotate together in unison with one another.

The fingers 32 are used in the tooling assembly 10 to engage and disengage the wire ends 12 of the stator assembly 14. There are numerous distinct fingers 32 set around the entire circumference of the tooling assembly 10, as perhaps depicted best by FIG. 3. The fingers 32 can have various designs and constructions for this purpose. In the embodiment of the figures, each finger 32 has a pin 50, a second set of teeth 52, and multiple protrusions 54. The pins 50 are depicted best by FIG. 4. The pins 50 are inserted and received in the slots 44 of the first plate 28. As the first plate 28 revolves, the pins 50 ride in and along the arcuate and curving longitudinal profile of the slots 44. The second set of teeth 52 can be disposed partway or more around the circumference of individual fingers 32. The second set of teeth 52 meshes with the first set of teeth 46 of the second plate 30. Upon revolution of the second plate 30 and meshing of the teeth 46, 52, the working portions 48 of the fingers 32 rotate with the second set of teeth 52, while non-working portions 56 of the fingers 32 remain rotationally static relative thereto.

Figure 6:
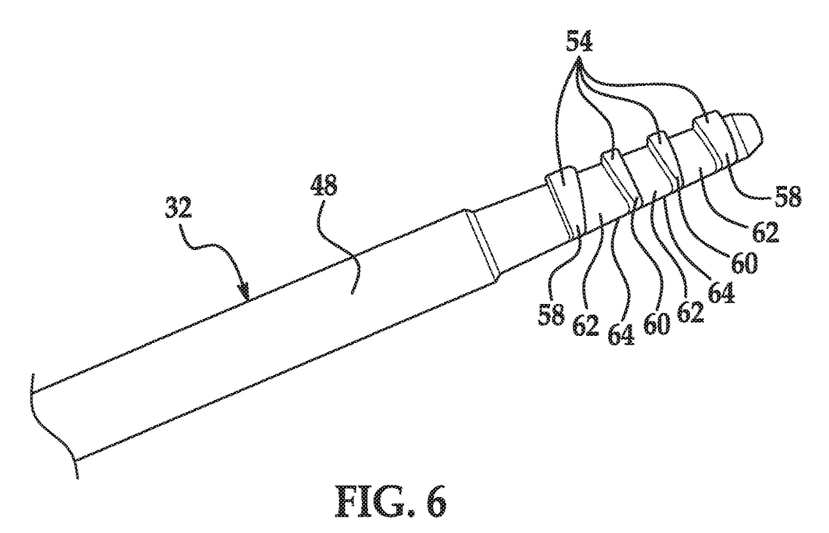
FIG. 6 depicts an embodiment of an individual finger enlarged and in isolation.
Figure 7:
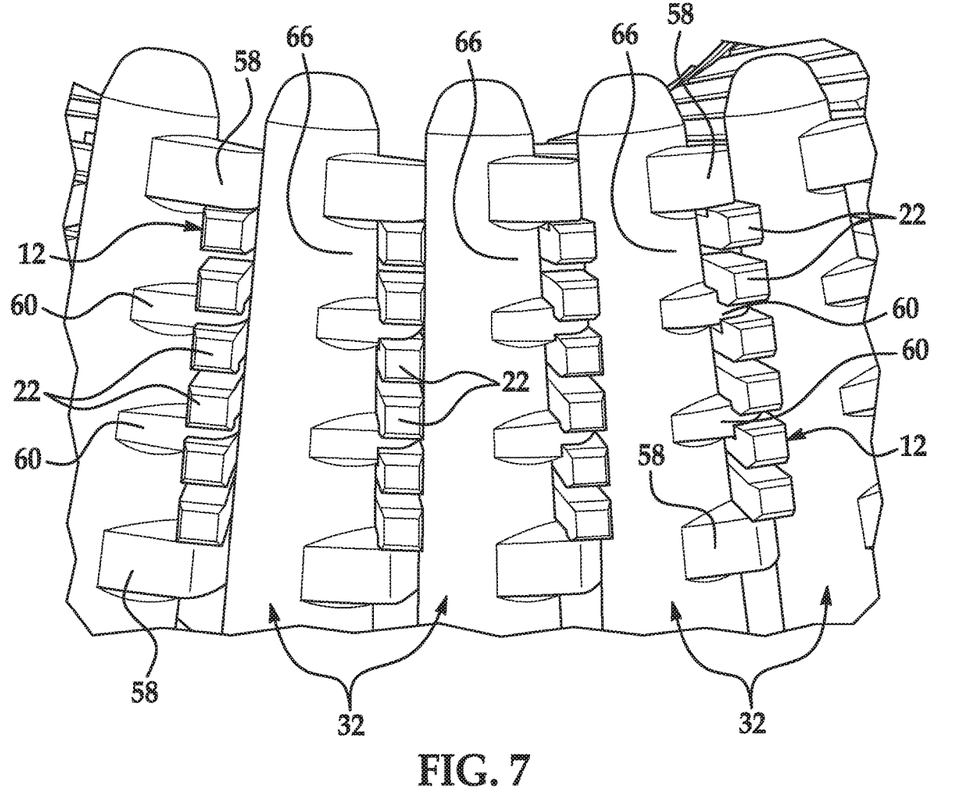
FIG. 7 is an enlarged view of an embodiment of protrusions of the fingers.

The protrusions 54 directly engage and come into abutting contact with the wire ends 12 of the stator assembly 14. The protrusions 54 can take different forms in different embodiments. In the embodiment of FIGS. 6 and 7, the protrusions 54 reside at terminal sections of the working portions 48 of the fingers 32 and rotate therewith. In this embodiment, the protrusions 54 include four in total: two outer protrusions 58 and two inner protrusions 60. The protrusions 54 have slanted confronting surfaces that form wedge-shaped channels 62 between the outer and inner protrusions 58, 60. The channels 62 are wider at a mouth 64 for initial receipt of the wire ends 12, and grow narrower toward a backend 66. With particular reference to FIG. 7, as the fingers 32 rotate toward the wire ends 12 for engagement, the mouth 64 of the channels 62 receives the pairs 22 of the wire ends 12. One pair 22 is separated from another pair 22 by the inner protrusions 60. Amid rotation, the pairs 22 progress through the channels 62 and are crowded and sorted via the narrowing channels 62. Once rotation of the fingers 32 is halted, the pairs 22 of the wire ends 12 are properly engaged and readied for the joining process. Here, the wire ends 12 have been subjected to a minimal degree of manipulation as they were crowded and sorted, and hence have substantially maintained their true position with the stator assembly 14. Moreover, the fingers 32 do not undergo movement along a z-axis 1200 (FIG. 3) for engaging and disengaging the wire ends 12.

As described, the method to engage the wire ends 12 can involve several steps. In one embodiment, from the retracted state, the first plate 28 is revolved and the fingers 32 advance radially-inwardly toward the wire ends 12. As the terminal sections of the fingers 32 are advanced into clearances 68 (FIG. 2) defined between successive sets of wire ends 12, the protrusions 54 can be at a rotational position to avoid interference with the wire ends 12 during advancement. Once fully advanced with the protrusions 54 placed in the clearances 68 (FIG. 1), the second plate 30 is revolved and the working portions 48 of the fingers 32 begin to rotate. The protrusions 54 then directly engage the wire ends 12 and the pairs 22 are crowded and sorted for the joining process. After joining, the working portions 48 can be rotated in the opposite rotational direction and the fingers 32 can be retracted out of the clearances 68 for subsequent processing.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A tooling assembly for engaging wire ends of a stator assembly, the tooling assembly comprising:
    a first plate having a plurality of slots residing therein;
    a second plate having a set of first teeth thereon; and
    a plurality of fingers engageable with the wire ends of the stator assembly, the plurality of fingers having a plurality of pins rideable in the plurality of slots of the first plate upon revolution of the first plate, the plurality of fingers having a set of second teeth meshable with the set of first teeth of the second plate upon revolution of the second plate.

2. The tooling assembly as set forth in claim 1, wherein the plurality of slots are arcuate and, upon revolution of the first plate, the plurality of fingers advances in a radial direction toward the wire ends of the stator assembly.

3. The tooling assembly as set forth in claim 1, wherein, upon revolution of the second plate, the plurality of fingers rotates for engaging the wire ends of the stator assembly.

4. The tooling assembly as set forth in claim 1, wherein the plurality of fingers has protrusions that crowd pairs of wire ends of the stator assembly upon revolution of the second plate.

5. The tooling assembly as set forth in claim 1, further comprising a first actuator interconnected with the first plate for revolving the first plate.

6. The tooling assembly as set forth in claim 1, further comprising a second actuator interconnected with the second plate for revolving the second plate.

7. The tooling assembly as set forth in claim 1, wherein, amid use of the tooling assembly, the plurality of fingers engages all of the wire ends of the stator assembly concurrently.

8. The tooling assembly as set forth in claim 1, wherein, amid use of the tooling assembly, the plurality of fingers engages the wire ends of the stator assembly without movement of the plurality of fingers in a z-axis relative to the stator assembly.

9. A tooling assembly for engaging wire ends of a stator assembly, the tooling assembly comprising:
- a first plate having a plurality of slots residing therein;
- a second plate having a set of first teeth thereon;
- a first actuator interconnected with the first plate for revolving the first plate;
- a second actuator interconnected with the second plate for revolving the second plate;
- a plurality of fingers engageable with the wire ends of the stator assembly, the plurality of fingers having protrusions and having a plurality of pins rideable in the plurality of slots of the first plate upon revolution of the first plate, the plurality of fingers having a set of second teeth meshable with the set of first teeth of the second plate upon revolution of the second plate, wherein the plurality of slots are arcuate and, upon revolution of the first plate, the plurality of fingers advances in a radial direction toward the wire ends of the stator assembly,
- wherein, upon revolution of the second plate, the plurality of fingers rotates for engaging the wire ends of the stator assembly and the protrusions crowd pairs of wire ends of the stator assembly upon revolution of the second plate, and
- wherein, amid use of the tooling assembly, the plurality of fingers engages all of the wire ends of the stator assembly concurrently without movement of the plurality of fingers in a z-axis relative to the stator assembly.

\* \* \* \* \*